United States Patent
Natesan et al.

(10) Patent No.: US 11,146,843 B2
(45) Date of Patent: Oct. 12, 2021

(54) ENABLING RETURN PATH DATA ON A NON-HYBRID SET TOP BOX FOR A TELEVISION

(71) Applicant: ACCENTURE GLOBAL SOLUTIONS LIMITED, Dublin (IE)

(72) Inventors: VijayChandar Natesan, Bangalore (IN); Srikanth G Rao, Bangalore (IN); Azarudeen Anifa, Bangalore (IN); Dongay Choudary Nuvvula, Hyderabad (IN); Chandra Nanduri, Johannesburg (ZA); Mathangi Gopalan Sandilya, Bangalore (IN); Tarun Singhal, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/443,314

(22) Filed: Jun. 17, 2019

(65) Prior Publication Data

US 2020/0396495 A1 Dec. 17, 2020

(51) Int. Cl.
*H04N 21/442* (2011.01)
*H04N 21/422* (2011.01)
*G06N 20/00* (2019.01)
*H04N 21/466* (2011.01)

(52) U.S. Cl.
CPC ....... *H04N 21/42226* (2013.01); *G06N 20/00* (2019.01); *H04N 21/44204* (2013.01); *H04N 21/44218* (2013.01); *H04N 21/4662* (2013.01)

(58) Field of Classification Search
None
See application file for complete search history.

(56) References Cited

U.S. PATENT DOCUMENTS

| 5,945,988 | A | * | 8/1999 | Williams | G11B 27/105 348/E17.005 |
| 6,040,829 | A | * | 3/2000 | Croy | H04N 21/4126 715/864 |
| 6,359,661 | B1 | * | 3/2002 | Nickum | H04B 1/202 348/734 |

(Continued)

FOREIGN PATENT DOCUMENTS

| AU | 2017100408 A4 | 5/2017 |
| EP | 1223757 A2 | 7/2002 |
| EP | 2945113 A1 | 11/2015 |

*Primary Examiner* — An Son P Huynh
(74) *Attorney, Agent, or Firm* — Mannava & Kang, P.C.

(57) ABSTRACT

An intelligent return path data (iRPD) system enables transmission of return path data via a communication network for a television connected to a non-hybrid set top box (STB). The iRPD system is configured to receive the key codes of the keys pressed on a remote control device along with the date time stamps and the location information. The iRPD system analyzes the keypress data along with the date time stamps to recognize the channels accessed in programming operations and the non-programming control operations executed by a viewer operating the remote control device. The viewer's behavior pattern is thus recorded and analyzed to identify the viewer. Upon identifying the viewer, various functions such as collecting the viewership statistics, implementing metered usage billing or ecommerce activities are enabled.

13 Claims, 13 Drawing Sheets

(56) References Cited

U.S. PATENT DOCUMENTS

| | | | | |
|---|---|---|---|---|
| 6,446,261 B1* | 9/2002 | Rosser | H04N 7/163 | 348/E7.061 |
| 6,530,083 B1* | 3/2003 | Liebenow | H04N 7/163 | 348/E7.061 |
| 6,766,526 B1* | 7/2004 | Ellis | H04N 21/482 | 725/57 |
| 6,983,478 B1* | 1/2006 | Grauch | G06Q 30/02 | 348/E7.07 |
| 7,054,849 B2* | 5/2006 | Prokopenko | H04N 21/44222 | 706/46 |
| 7,111,320 B1* | 9/2006 | Novak | H04N 21/42204 | 725/139 |
| 8,108,886 B1* | 1/2012 | Murahashi | H04N 21/44222 | 725/13 |
| 8,225,356 B2* | 7/2012 | Javvaji | H04N 21/47 | 725/57 |
| 8,327,395 B2* | 12/2012 | Lee | H04N 21/6582 | 725/10 |
| 8,352,980 B2* | 1/2013 | Howcroft | H04N 21/2668 | 725/34 |
| 8,381,239 B2* | 2/2013 | Burton | H04H 60/45 | 725/13 |
| 8,832,737 B2* | 9/2014 | Ellis | H04N 21/4858 | 725/38 |
| 8,832,769 B2* | 9/2014 | Migos | G08C 17/00 | 725/133 |
| 8,854,555 B2* | 10/2014 | Adderly | H04N 21/4532 | 348/731 |
| 8,881,222 B2* | 11/2014 | Harris | H04N 21/42204 | 725/141 |
| 9,131,189 B2* | 9/2015 | Green | H04N 21/47 | |
| 10,123,088 B2* | 11/2018 | Preston | H04N 21/4821 | |
| 10,277,944 B2* | 4/2019 | Venetucci | H04H 20/00 | |
| 10,284,897 B1* | 5/2019 | Dever | G06F 3/0488 | |
| 2002/0060750 A1* | 5/2002 | Istvan | H04N 5/44543 | 348/569 |
| 2003/0153347 A1* | 8/2003 | Glass | H04W 88/08 | 455/524 |
| 2006/0184967 A1* | 8/2006 | Maynard | H04N 21/466 | 725/46 |
| 2007/0046641 A1* | 3/2007 | Lim | G06F 3/0237 | 345/173 |
| 2008/0092156 A1* | 4/2008 | Ferrone | H04N 21/44218 | 725/13 |
| 2009/0131764 A1* | 5/2009 | Lee | A61B 5/6803 | 600/301 |
| 2009/0138805 A1* | 5/2009 | Hildreth | H04N 21/64322 | 715/745 |
| 2011/0069940 A1* | 3/2011 | Shimy | H04N 5/44543 | 386/296 |
| 2011/0078572 A1* | 3/2011 | Milazzo | G06F 11/34 | 715/733 |
| 2011/0154193 A1* | 6/2011 | Creutz | G06F 40/274 | 715/261 |
| 2011/0197214 A1* | 8/2011 | Burton | H04N 21/4668 | 725/13 |
| 2011/0310305 A1* | 12/2011 | Alexander | H04N 21/4135 | 348/725 |
| 2012/0033933 A1* | 2/2012 | Suzuki | G11B 27/105 | 386/230 |
| 2012/0278331 A1* | 11/2012 | Campbell | H04N 21/44204 | 707/740 |
| 2013/0173765 A1* | 7/2013 | Korbecki | H04N 21/42209 | 709/221 |
| 2013/0205314 A1* | 8/2013 | Ramaswamy | H04N 21/44218 | 725/14 |
| 2013/0254787 A1 | 9/2013 | Cox et al. | | |
| 2014/0351158 A1* | 11/2014 | Felse | H04L 51/14 | 705/330 |
| 2015/0206169 A1* | 7/2015 | Ye | G06Q 30/0242 | 705/14.41 |
| 2015/0277710 A1* | 10/2015 | Lee | G06F 3/0488 | 715/822 |
| 2015/0286873 A1* | 10/2015 | Davis | G06F 1/1694 | 382/103 |
| 2015/0378600 A1* | 12/2015 | Sloan | G06F 3/04842 | 715/773 |
| 2016/0029082 A1* | 1/2016 | Wordley | H04N 21/462 | 725/52 |
| 2016/0044357 A1* | 2/2016 | Wang | H04N 21/4334 | 725/14 |
| 2016/0057497 A1* | 2/2016 | Kim | H04N 21/42203 | 725/10 |
| 2016/0249098 A1* | 8/2016 | Pecjak | H04N 21/44218 | |
| 2017/0060368 A1* | 3/2017 | Kochura | G06F 8/38 | |
| 2017/0164050 A1* | 6/2017 | Rai | H04N 21/472 | |
| 2017/0180813 A1* | 6/2017 | Kang | H04N 21/44222 | |
| 2018/0137529 A1* | 5/2018 | Griffin | G06Q 50/01 | |
| 2018/0191754 A1* | 7/2018 | Higbee | G06F 21/554 | |
| 2018/0225416 A1* | 8/2018 | Wong | G16B 40/00 | |
| 2019/0332963 A1* | 10/2019 | Wong | G06N 20/00 | |

\* cited by examiner

ENABLING RETURN PATH DATA ON A NON-HYBRID SET TOP BOX FOR A TELEVISION

BACKGROUND

A set top box (STB) or a cable box is an information appliance device the generally contains a TV-tuner input and provides the output to a television set, turning the source signal into content in a form that can be displayed on the television screen. The STBs are used in cable television, satellite television or other television systems. In many developed countries, the STBs include smart STBs or hybrid STBs which are capable of communication over Internet Protocol (IP) networks. Return Path Data (RPD) is available in hybrid STBs but in emerging markets, they constitute less than 15% of the total STBs installed. Replacing existing non-hybrid STBs with hybrid STBs is unviable as it would involve significant capex investment.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
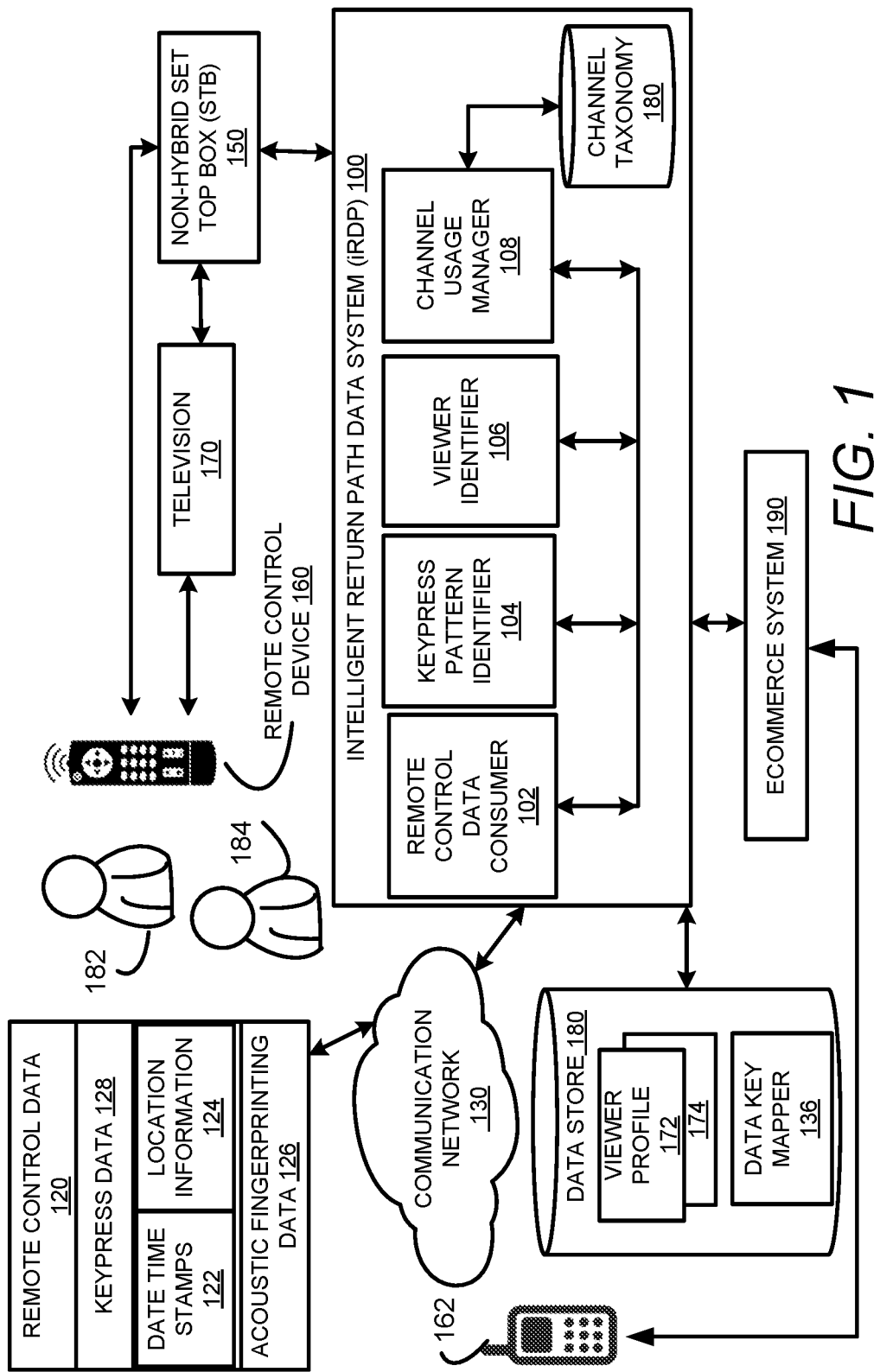
FIG. 1 is a block diagram that shows an intelligent return path data (iRPD) system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An intelligent return data path (iRPD) system for use with a non-hybrid set top box (STB) is disclosed. The iRPD system establishes a return data path (return path data) for a viewer of a television connected with the STB to send data to a backend for analysis via a communication network (e.g., cellular, Wi-Fi etc.) and thereby to enable various user functions as detailed further herein. In an example, the iRPD system can be connected to a traditional linear television via the non-hybrid STB where the viewers must watch a scheduled television program at the time the program is broadcasted and on the channel that the program is being presented on. STBs are hardware devices that allow a digital signal to be received decoded and displayed on the television. STBs can be of different types with different functionalities. Non-hybrid STBs include those that do not support Internet Protocol (IP) based communication. Hence, non-hybrid STBs can only receive television signals via a dedicated cable connection.

The television is therefore associated with a household which may include multiple viewers and is hence characterized by specific location information that remains unchanged for lengthy time periods e.g., years. The viewers can manipulate the display of the television via a remote control device which allows a viewer to execute programming operations and non-programming control operations. The programming operations can include the viewer selecting specific channel numbers of the remote control device or using the channel '+' or the channel '−' buttons to surf to higher or lower numbered channels. Non-programming control operations can include volume increase or decrease operations, adjusting the display settings of the television, etc. In response to the user pressing the keys on the remote control device to access the various operations, the key codes are transmitted to the STB and/or to the television to enable the corresponding functions. In an example, the key codes thus transmitted can be further communicated as keypress data to the iRPD system via the communication network. In an example, the iRPD system can be connected as a backend to the STB. Additionally, each keypress data can be transmitted along with the date-time stamp which includes the date and time at which the keypress data was generated. The location information of the television and acoustic fingerprinting data peculiar to a television channel is also transmitted to the iRPD system.

The iRPD system receives the remote control data including the keypress data, the date-time stamps and the location information. The key codes included in the keypress data are mapped to specific remote control keys in order to identify the keys pressed by the viewer. The keys thus mapped are used to generate key clusters which enable identification of specific channels or a particular series of operations executed by the viewer while watching the television. In an example, the hardware can be configured to enable two-way communication can be configured as a dongle which includes a Global System for Mobile Communication (GSM) module for the generation of the location information and a real time clock (RTC) for the generation of the date-time stamps. In an example, the hardware can be incorporated into the remote control device being used to operate the television. The data-time stamps of the keys are retrieved and the keys are clustered based on the timings associated with the keypress data. In an example, clustering techniques such as K-means clustering can be employed to generate the key clusters. The operations associated with the key clusters can be identified based on the key clusters. For programming operations, the channels accessed by the viewer are determined based, for example, on a channel taxonomy which provides information regarding channel attributes such as, the channel numbers, channel name, programming information etc. In addition, the viewer behavior characteristics such as the time period or duration for which the channel was viewed, the time at which the channel was viewed, the keypress data gathered during the entire viewing session which may include multiple channels at different time periods within the session etc. are also determined. A return path data wherein the keypress data and other information is exchanged is thus established via the communication network between the television and the backend systems.

The data thus obtained can be used for identifying a specific viewer among the plurality of viewers within the household who may be using the television. As mentioned above, the series of keys pressed by the viewer during a viewing session are analyzed for viewing patterns which characterize the viewer's behavior. In an example, viewing patterns over a considerable time period based on the amount of usage e.g., a month where the viewer uses the television daily are analyzed for viewer behaviors. The iRPD system can be configured to store respective viewer profiles for each of the viewers using the television regularly. Each viewer profile can include viewer attributes such as viewer affinities of channels, viewing patterns, etc.

Accordingly, the key clusters can be further clustered using a trained clustering behavior model based on various channel/viewer attributes. In an example, the trained clustering behavior model can implement a GMM for generating the clusters. The clusters can be generated based on multiple dimensions including the channel genres, the viewing durations, the timings at which the channels were viewed and distinct viewing patterns etc. The distinct viewing patterns can include channel scrubbing behavior and invalid channel scrubbing behavior. If the viewer arrives at a channel after surfing through multiple channels, such behavior can be indicative of lower viewer affinity to the channel. Instead, a viewer directly landing on the channel by pressing the channel number, can be indicative of high affinity. Similarly, certain control operations such as increasing the volume or adjusting the display settings while viewing a certain channel can be indicative of higher viewer affinity. In an example, the viewer affinities to the different channels can be estimated as a function of the distance between the key clusters corresponding to the channels when plotted against the time stamp data.

As the keypress data is received, the key clusters and the further clusters are generated and matched with the existing viewer profiles. If there is a match with one of the existing viewer profiles, then the viewer is identified. If no match can be determined from the existing viewer profiles to the current keypress data which is received from the television, a new viewer profile can be generated and stored. Based on additional data received over the time, the new viewer profile can be further built or the viewer profile can be deleted.

On distinctly identifying the viewer, various functions can be enabled. In an example, the various viewership statistics can be obtained. The statistics thus obtained can be used to implement metered usage billing wherein the viewers only pay for the programs/channels that are viewed as opposed to the subscription billing where the viewers pay for a slew of channels many of which may not be viewed by any of the viewers in the household. The total amount of time that each of the channels are viewed can be aggregated for a given household and the time billed accordingly.

Another activity enabled by the two-way communication established by the return path data includes ecommerce activities. A content provider can also simultaneously turn advertiser by providing ancillary advertising content. The advertising content can enable the viewers to purchase content being viewed on the television using the remote control device. The iRPD system can be connected to an ecommerce system to enable purchase activity. Whenever, the content on the television includes one or more products for purchase, the corresponding product codes can be displayed to the viewer as overlays for a short time or scrolled at the bottom of the television screen. The viewer can be instructed to enter the product code via the remote control device. Further authentication is enabled via transmitting a one-time password (OTP) to the viewers email address or a mobile device registered with the viewers account with the television service provider. In an example, the viewers account with the television service provider can be linked with the viewers account with the ecommerce system. When the viewer enters the OTP via the remote control device, the viewer's identity is confirmed and the viewer's data is accessed from the ecommerce system thereby retrieving the viewer's billing information and enabling the purchase of the product(s) without the need for the viewer to even access the ecommerce website.

The iRPD system disclosed herein provides a technical solution to the technical problem of establishing a return path data via a non-hybrid STB. A problem currently exists where the television service provider provides content to viewers but cannot receive communication from the viewers as no return path data is established. Return path data which enables a two-way communication between a viewer of the television and the backend system is currently available on hybrid STBs which include hardware for IP communication. However, in emerging markets, such hybrid STBs are not yet widely employed and no efficient solution exists for enabling return path data on non-hybrid STBs which do not include hardware for communicating with IP networks. Currently no efficient solution deployed to measure audience viewership for non-hybrid STBs.

The iRPD system as disclosed herein compensates for the lack of hardware in the non-hybrid STB by enabling additional functionality on the remote control device or a dongle and enables establishing the return path data via the communication network without the need to replace the non-hybrid STB with hybrid STB which can be capital intensive. For example, the additional hardware components installed in the iRPD system cost a few dollars whereas a hybrid STB costs at least a hundred dollars more than a non-hybrid STB. Even if a two-way communication is established via hybrid STBs, traditional television systems are also not enabled to identify individual viewers within a given household unless distinct user logins are also enabled. The iRPD system is able to track viewing patterns and viewer preferences/habits of individual viewers in a given household and build respective viewer profiles without requiring explicit user logins. The individual identification of viewers also enables authentication mechanisms which are useful for additional functionality such as metered usage monitoring and ecommerce activities. The iRPD system thus collects viewer statistics and monitors usage but also enables various other functions as detailed further herein.

FIG. 1 is a block diagram that shows an iRPD system 100 in accordance with examples disclosed herein. The iRPD system 100 collects remote control data 120 emitted by at least a remote control device 160 controlling a television 170 connected to a non-hybrid STB 150, aggregates and analyzes the data to identify information regarding the programs or television channels being watched by one or more viewers 182, 184 to accurately identify the viewer(s) 182, 184 and to enable various viewer functions. The remote control device 160 can include a consumer infrared device which sends digitally-coded pulses of infrared radiation to control functions of the television 170 such as the power, volume, channels, playback, track change, etc. The viewer functions can include but are not limited to, monitoring and recording the television usage statistics, providing for metered usage, enabling ecommerce activities via the television etc. The iRPD system 100 includes a remote control data consumer 102, a keypress pattern identifier 104, a viewer identifier 106 and a channel usage manager 108. The iRPD system 100 can be connected to the television 170 via the STB 150. In addition, the iRPD system 100 can be configured to receive the remote control data 120 via a communication network 130. In an example, either the remote control device 160 or the STB 150 can have an associated communication module to enable communicating the remote control data 120 to the iRPD system 100 via the communication network 130. If associated with the STB 150, the communication module can be inserted as a dongle into a port of the STB 150. In an example, the communication network 130 can be a cellular network and the communication module can be a GSM module or other cellular communication hardware. In an example, the communication network 130 can be an IP based network and the communication hardware can include an IP based communication hardware module. While the remote control device 160 can be configured to control both the STB 150 and the television 170, it may happen in certain instances that the television 170 can have its own remote control device provided by the television manufacturer. In such instances having the communication module coupled to the STB 150 can enable transmission of the remote control data 120 to the iRPD system 100. The iRPD 100 can be located on a backend platform remotely from the location of the television 170 and the STB 150. The iRPD system 100 may be connected to a plurality of such televisions and STBs via the communication network 130 thereby enabling viewer functions for many households with non-hybrid STBs. If the STBs are non-hybrid STBs with no return path through the cable network, the communication network 130 can provide a means of communication with the iRPD system 100 outside of the cable network.

Multiple viewers 182, 184 etc. can be watching programs on various channels by operating the television 170 via the remote control device 160. The remote control device 160 is operated by one of the viewers 182, 184 e.g., the viewer 182 by pressing the keys of the remote control device 160. In an example, the television 170 can be a linear television wherein the viewers must watch a scheduled TV program at the time it's broadcasted, and on the channel it's presented on. As the viewer 182 manipulates the keys or buttons of the remote control device 160 various programming operations or non-programming control operations can occur at the STB 170. The programming operations can be executed via pressing numeric keys to access various television channels to watch the programs being presented e.g., changing channels, selecting particular channels etc., can be considered programming operations. The non-programming control operations can include those for increasing or decreasing volume, changing the display settings, powering on or off one or more of the television 170 and/or the STB 150 etc. The various programming and non-programming operations conducted by the viewers 182/184 are transmitted to the iRPD system 100 via the communication network 130 for analysis and execution of the end user functions. In addition to the components for enabling the programming and non-programming control operations, the remote control device 160 can also include hardware to transmit geo-location data and world time/date.

Whenever, the viewer 182 presses a key on the remote control device 160 for manipulating the television 140, the keypress data 128 is transmitted to the iRPD platform 100. The keypress data 128 can be associated with the date/time stamp 122 indicating the time at which the key was pressed in addition to the location information 124. The keypress data 128 can be transmitted as hexadecimal code of the particular key that was activated. Each key on the remote control device 160 can have a respective hexadecimal code. The remote control data consumer 102 receives the remote control data 120 including the hexadecimal code, the data-time stamp 122 and the location information 124 and employs the code to identify the key that was pressed. Each time a key is pressed, the remote control data 120 as described above is transmitted to the remote control data consumer 102 via the STB 150. The remote control data consumer 102 employs a data key mapper 136 to identify the key that was pressed by the viewer 182. In case the viewer 182 continues to press the keys in quick succession, the corresponding date-times at which the keys may vary by a few seconds and the remote control data consumer 102 can identify the corresponding keys pressed successively.

In an example, acoustic fingerprinting data 126 can be also be transmitted along with the keypress data from the STB 170 to the iRPD system 100. Digital audio fingerprinting allows embedding a digital signature or code into acoustic content. The digital signature can then be retrieved and used to identify the audio content, its owners and/or recipients. The remote control device 160 or the STB 170 can be configured to transmit the acoustic fingerprinting data 126. This technique enables each channel which is broadcasted to carry a silent audio fingerprint in the sound which can be picked up by the acoustic meters which may be included in the remote control device 160 or the dongle and can be used to ensure that the actions on the remote control device 160 are reflected on the television 170. Visual validation may also be provided by arranging a mini camera on the STB 150 in order to capture a channel change and validate whether the action is reflected on the television 170. The remote control device 160 can include hardware for gathering and transmitting the required data to the STB 150 as detailed further herein. In an example, the hardware for gathering and transmitting the requisite data e.g., the keypress data 128, the location information 124 and the date/time stamps 122 etc. can be used as the dongle with the STB 150.

The information regarding the keys pressed, the date-time stamps and the geo-location is accessed by the keypress pattern identifier 104 in order to identify the keypress pattern executed by the viewer 182. The keypress pattern identifier 104 clusters the received key information based on the date-time stamps 122 using clustering methodologies as detailed further herein. Therefore, clusters or groups of keys can be obtained and based on the type of operation associated with the groups, the operation executed by the viewer 182 can be identified. For example, if a cluster includes 2 or 3 numeric characters, then the cluster can indicate a channel number that the viewer 182 is trying to access in a programming operation. Based on the cluster of numeric keys generated, the particular channel accessed by the viewer 182 can be identified using a channel taxonomy 130. If the cluster includes a single key, then the cluster likely pertains to a non-programming control operation such as increasing/decreasing volume, switching off the power, adjusting a display setting etc. Of course, such non-programming control operations may also require the viewer to operate more than one key or the programming operations may also include operation of a single key.

The data regarding the channels accessed by the viewer 182, the control operations executed by the viewer 182 and the acoustic fingerprinting data are accessed by the viewer identifier 106. The viewer identifier 106 analyzes the patterns of the clusters, calculates the distances between the clusters along with the acoustic fingerprinting data to determine unique viewer behaviors. The clusters and the attributes of the clusters such as the sizes of the clusters, the distances between the clusters, the number of points within the clusters etc. are indicative of viewer preferences. Thus, the numeric keys in a first cluster which relate to a specific channel number are indicative of the viewer's 182 desire to access the channel. However, if second and third clusters of keys occur close together immediately in succession to the first cluster, then it is a case of valid channel scrubbing wherein the viewer 182 may be just scanning the channels to identify content of interest. If, on the other hand, there is a large distance between the first cluster and a second cluster, then it can be identified that the viewer 182 watched the first cluster and that the viewer was interested in the contents of the channels associated with the clusters. Such viewer behavior can be recorded by the viewer identifier 106. Various attributes of the viewer's 182 television viewing habits such as the television channels watched, the time during which they are watched, the duration of watching, the extent of viewer interest in the television channel, the frequency of watching etc. can thus be identified and recorded by the viewer identifier 106 in a viewer profile 172 on a data store 130. The viewing habits of the viewer 184 can be similarly determined and recorded by the iRPD system 100 as viewer profile 174. As the iRPD system 100 constantly receives the remote control data 120 from the television 170 or the STB 150, the viewership can be constantly tracked, the viewer profiles 172, 174 can be updated, new profiles can be added and outdated profiles may be deleted. Therefore, the iRPD system 100 is configured to differentiate between the various viewers who use the television 170 within a single household.

Unique identification of the viewers on the television 170 enables the iRPD system 100 to execute various functions. One of the functions is to monitor and collect viewership data and statistics for the various channels and programs. Accordingly, the iRPD system 100 includes a channel usage manager 108. In fact, not only does the channel usage manager 108 include functionality for generating viewing insights but also for implementing metered usage billing. The channel usage manager 108 can be further configured to generate reports.

Another function enabled by the iRPD system 100 is allowing ecommerce activities for viewers of the television 170. The iRPD system 100 can be connected to an ecommerce system 190 that allows content providers to also be advertisers so that as content is being played on the television, not only are advertisements directly related to the content can be displayed to the viewer(s) 182, 184 but the purchase of the corresponding products is also enabled using the television 170, the STB 150 and the remote control device 160. Diverse ecommerce activities are therefore enabled via the application programming interfaces (APIs) put forward by the ecommerce system 190 which can allow linking of profiles of the viewers of the iRPD system 100 in accordance with the methodologies disclosed further herein. For example, the viewer can provide the user account information of the ecommerce system 190 while signing up for the television services from the iRPD system 100. The viewers 182, 184 may be able to purchase a costume being used by participants in a program or if an event at a particular location is being telecast, may be enabled to purchase travel packages to that location etc. Payment for the purchased products can be facilitated via Application Programming Interfaces (APIs) associated with online payment services of the ecommerce system 190. In an example, additional equipment such as the viewer's mobile phone 162 can be used for authentication purposes as detailed infra.

Another function enabled by the user identification of the iRPD system 100 is provisioning for metered usage via the channel usage monitor 108. The channel usage manager 108 can employ the information from the viewer identifier 106 regarding the television channels watched, the length of time the channels were watched etc. to charge the viewers on the channel usage basis. The viewers are thus able to better use their funds for the programs that they actually watch as opposed to paying upfront for channels and programs that are not viewed.

Figure 2:
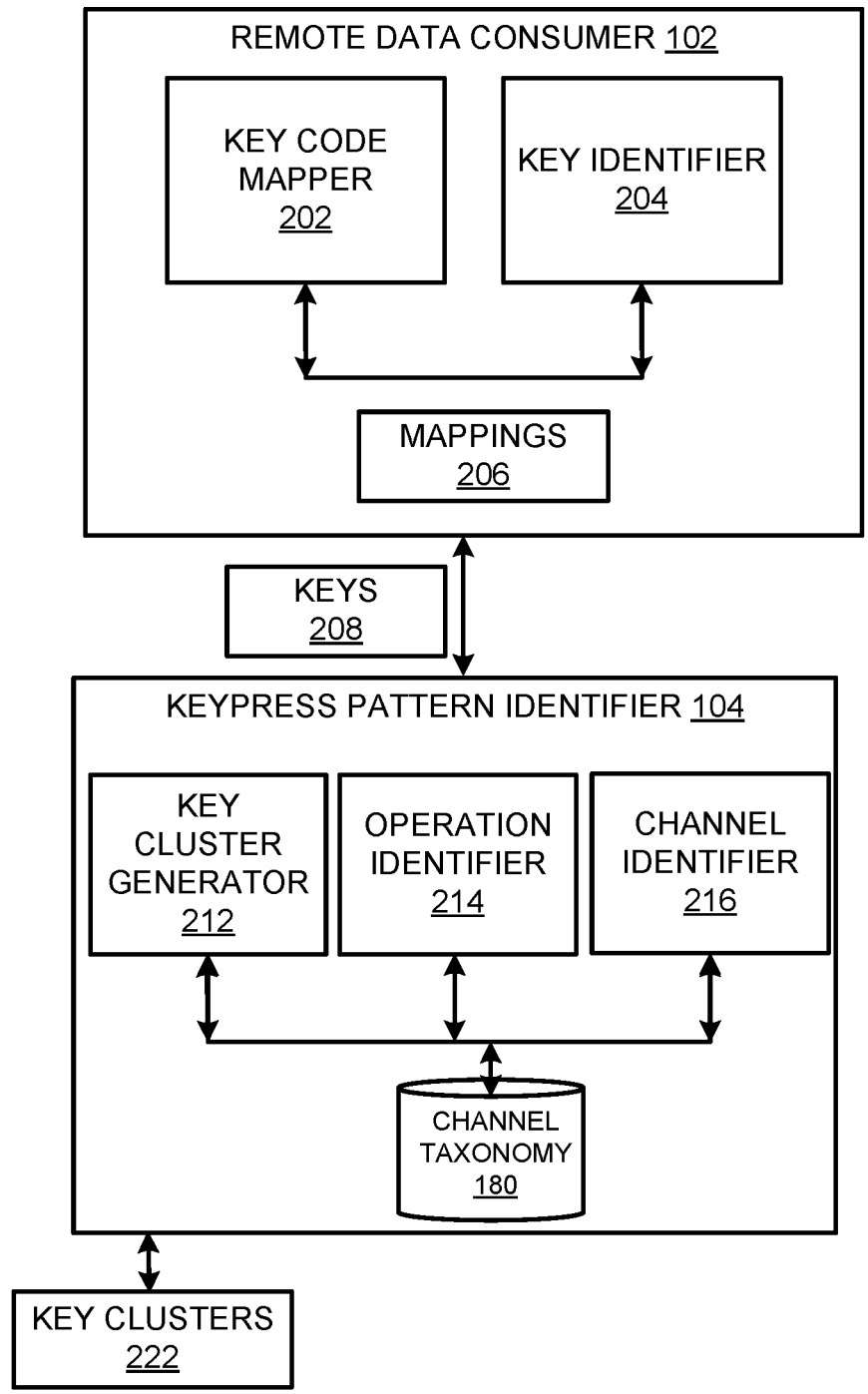
FIG. 2 shows block diagrams of a remote control data consumer and a keypress pattern identifier in accordance with the examples disclosed herein.

FIG. 2 shows block diagrams of the remote control data consumer 102 and the keypress pattern identifier 104 in accordance with the examples disclosed herein. As mentioned above, the keypress data 128 is received as hexadecimal data from the STB 150. A key code mapper 202 included in the remote control data consumer 102 maps the received hexadecimal data to specific keys. In an example, American Standard Code for Information Interchange (ASCII) is used to the mappings 206. The mappings 206 generated by the key code mapper 202 can be employed by the key identifier 204 in order to identify the keys 208 pressed by the viewer 182. The information from the key identifier 204 is used by the keypress pattern identifier 106 to identify the patterns associated with the keys pressed by the viewer 182.

The keypress pattern identifier 104 includes a key cluster generator 212, an operation identifier 214 and a channel identifier 216. The key cluster generator 212 accesses not only the particular keys pressed by the viewer 182 but also the date-time stamps 122 in order to generate clusters of the keys recognized by the key code mapper 202. In an example, clustering techniques such as K-means clustering wherein centroids are determined for each group and data points are clustered or grouped based on their minimum distances to the centroids can be employed to generate a first set of clusters or the key clusters 222.

The keys that are pressed within a certain time threshold can be therefore considered as pressed successively and clustered together. The time threshold used for determining successive key activations can be set by an administrator of the iRPD system 100. Each of the key clusters 222 are accessed by the operation identifier 214. The operation identifier 214 identifies if the viewer 182 was executing a non-programming operation of manipulating the settings of the television 170 etc. or a programming operation of accessing the various television channels with each of the key clusters 222 based for example, on whether a given cluster includes one or more of numeric keys such as channel keys or non-numeric keys like volume/display control keys or power keys. In an example, methodologies such as but not limited to classifiers can be employed to distinguish between the clusters with numeric or non-numeric keys. Subsets of clusters including the channel keys are used by the channel identifier 216 to identify the channel(s) selected by the viewer 182 based on the channel taxonomy 180. In an example, channel attributes such as but not limited to, channel numbers, channel name, time stamps, the duration for which the channel was watched etc. are all extracted by the channel identifier 216 and communicated to the viewer identifier 106.

Figure 3:
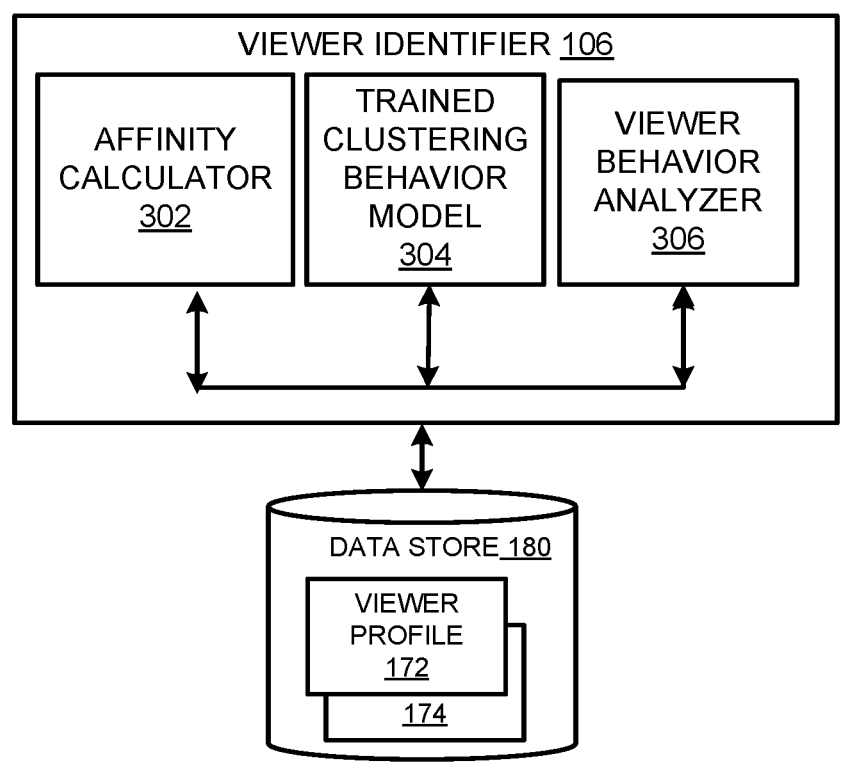
FIG. 3 shows a block diagram of the viewer identifier in accordance with the examples disclosed herein.

FIG. 3 shows a block diagram of the viewer identifier 106 in accordance with the examples disclosed herein. The viewer identifier 106 receives the information regarding the programming and the non-programming operations executed by the viewer 182 in order to determine the viewer's 182 behavior and thereby uniquely identify the viewer 182 as differentiated from the viewer 184 who may both be using the same television 170 at a location as conveyed in the location information 124. The viewer identifier 106 uses the data from the remote control device 160 over a considerable time period e.g., about one month in order to identify unique viewer behaviors and hence the viewers 182, 184. In an example, multiple dimensions can be applied to the remote control data 120 from the STB 170 in order to determine viewer behavior which can include affinities to particular television channels, the time of viewing the channels, specific months of the year when certain channels are viewed, the programming or non-programming operations executed by the viewer 182 when viewing a channel etc.

The affinity calculator 302 can be configured to differentiate viewer behavior such as channel scrubbing wherein the viewer 182 jumps from one channel to another. More particularly, the affinity calculator 302 accesses the channels accessed by the viewer 182 as determined by the channel identifier 216. The affinity calculator 302 employs pattern analysis over a month of the remote control data 120 to arrive at viewer affinity. In an example, the factors affecting the viewer affinity towards a particular channel can include but are not limited to, average duration per session for which the channel was watched, the frequency of channels watched, the non-programming control operations executed when watching the channel etc. In an example, the days on which the television 170 is not switched on may be deleted from the calculations in order to increase accuracy. Therefore, when considering channel scrubbing behavior, a valid scrubbing behavior where the viewer 182 surfs channels is less useful in determining channel affinity as opposed to an invalid scrubbing behavior where the viewer 182 selects a channel for watching for a considerable time period. Therefore, invalid channel scrubbing clusters are considered as a primary factor in recognizing channel affinity of the viewers.

Upon determining the channel affinity, a trained clustering behavior model 304 clusters the remote control data 120 using multiple dimensions including time at which the channels were watched, the genre of the channels, the day of the week, the season or months during which the channels were watched or other unique consumption pattern or duration watch pattern. In an example, the clustering can be based on EM or GMM. GMMs which are more flexible than K-means for clustering. Moreover, GMMs support mixed membership of the clusters. The interpretation and validation of consistency within the clusters of data can be determined using Silhouette Coefficient. Different mathematical formulae as detailed infra can be used to obtain the channel affinity.

The channel affinities thus obtained are employed by the viewer behavior analyzer 306 to determine viewer behavioral patterns corresponding to each of the viewers 182, 184. Each of the viewers 182, 184 can be characterized by behavioral clusters that are representative of the unique channels watched by the viewer, the duration for which the channel was watched, the number of channels watched, the timings at which the channels were watched, the modes of channel selection etc. The modes of channel selection can include channel scrubbing where the viewer 182/184 can arrive at the selected channel via surfing through other channels. Alternately, the viewer 182/184 can arrive at the selected channel directly by pressing the channel number on the remote control device 160.

Initially, when the remote control data 120 is received, the channels are identified and a matching process may begin with the existing viewer profiles 172, 174 and a viewer profile can be initially selected. As further keypress data is received, the initially selected viewer profile can be confirmed or another viewer profile can be selected. If the received keypress data does not match a viewer profile, a new viewer profile can be initiated. As further matching data is received, the new viewer profile can be refined further. However, if no further matching data is received, the viewer profiles can be configured to be decayed and deleted. Therefore, as new viewers use the television 170, new profiles can be initiated and developed and similarly, as viewers stop using the television 170, the viewer profiles can be deleted. In an example, the creation of viewer profiles is an offline process. One of the viewers 182, 184 may suddenly want to watch something out of the recorded interests. Such exception points can happen over a period of time. Hence, the viewer profiles are developed over at least 3-4 months of data. The data profiles then can be further utilized by Direct To Home (DTH) television service providers for content or ad targeting.

Figure 4:
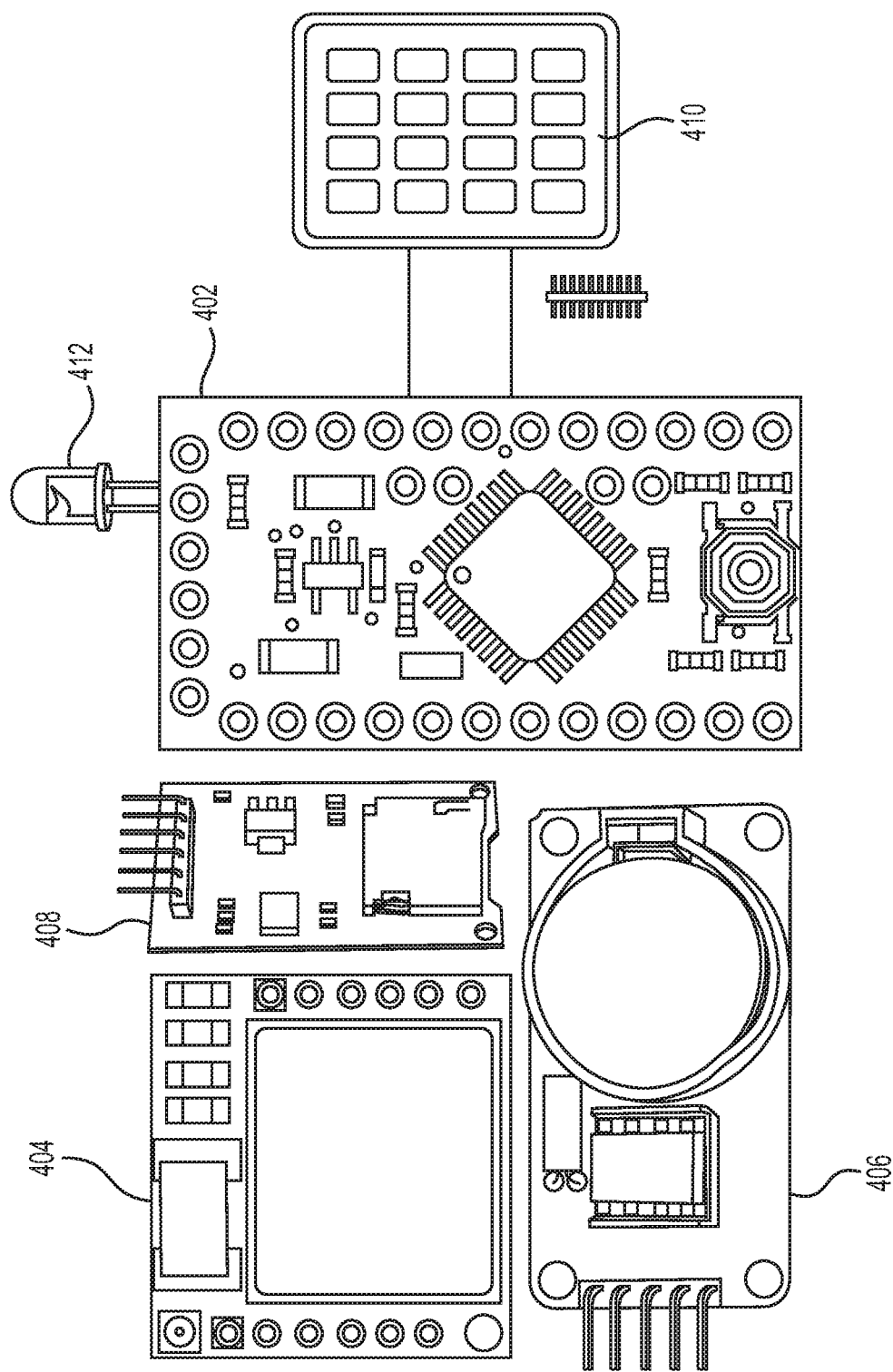
FIG. 4 shows a block diagram of an example of a remote control device that can be used for enabling return path communication via a non-hybrid set top box (STB) in accordance with the examples disclosed herein.

FIG. 4 shows a block diagram of an example of a hardware unit 400 that can be used for enabling return path communication via the non-hybrid STB 150 in accordance with the examples disclosed herein. The hardware unit 400 includes a main processor 402 for controlling the gathering and transmission functions of the various other hardware components. A GSM module 404 is included within the hardware unit 400 for transmitting the remote control data 120. The GSM module 404 can be configured to get the geo-location by tower signal in addition to gathering the real-world time. In addition a RTC module 406 is included in order to log time events. Real-world time can be tracked using the RTC module 406 in case of a network failure when the GSM module 404 is unable to gather the date-time data from the tower. A secure digital (SD) module 408 is employed as a data logger to store offline data. Thus, when the network is down, the remote data 120 can be cached at the SD module 408. As mentioned herein, the hardware unit 400 can be configured as a dongle which includes the main processor 402, the GSM module 404, the RTC module 406 and a secure digital module 408.

In an example, the hardware unit 400 can be incorporated into the remote control device 160 so that the remote control data 120 is transmitted entirely to the STB 170 from the remote control device 160 without the need for the dongle. A key board 410 is included in the remote control device 160 in addition to the hardware components described above. The keyboard 410 enables for the viewers 182/184 to press the keys for accessing the various channels and to control the television 170. A light emitting diode (LED) transmitting 412 is also included for transmitting the different types of data gathered/generated at the remote control device 160.

Figure 5:
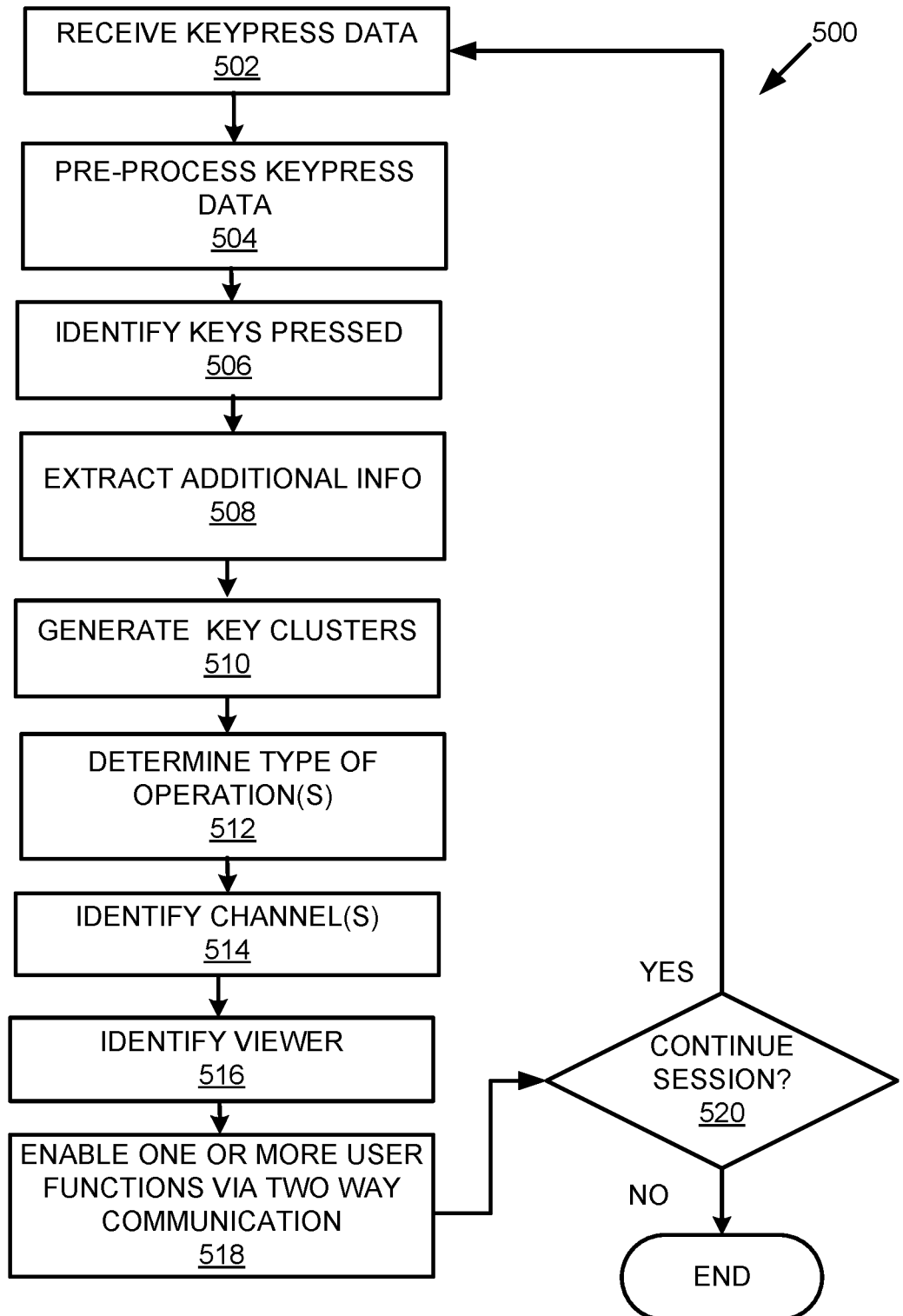
FIG. 5 shows a flowchart that details a method of enabling two-way communication between a viewer and a television service provider in accordance with the examples disclosed herein.

FIG. 5 shows a flowchart 500 that details a method of enabling two-way communication between a viewer and a television service provider by the iRPD system 100 in accordance with the examples disclosed herein. The method begins at 502 wherein the remote control data 120 generated at the remote control device 160 by the viewer 182 is received by the iRPD system 100 along with the date-time stamps 122 and location information 124 via the communication network 100. The data received is pre-processed by the iRPD system 100 at 504 via normalization in order to compensate for the keypress data that may skew an entire dataset. The various keys that are pressed by the viewer 182 are identified at 506 by mapping the key codes transmitted by the remote control device 160. The additional information associated with the keypress data including the date-time stamps 122, the location information 124, and the acoustic fingerprinting data 126 are extracted at 508. The received keypress data 128 is clustered at 510 by clustering the key codes received from the remote control device 160 to generate key clusters 222 based on the date-time stamps 122 using different clustering methodologies as detained herein. In an example, the K-means clustering methodology may be employed for the clustering. The key clusters 222 can include keys pressed for programming operations such as changing channels etc. or non-programming control operations. Accordingly, based on the identified keys and the key clusters 222, the different types of operations executed by the viewer 182 via the remote control device 160 are identified at 512. One or more of the channels are accessed by the viewer 182 and the control operations executed by the viewer in accessing the channels or while viewing the channels are identified at 514. The channels viewed, the timings of the channels viewed, the type of control operations executed while viewing the channels etc. can be used to identify the viewer at 516. If the viewer's profile cannot be found in the existing profiles and the viewer is not identified, then a new viewer profile can be generated. Various user functions based on identified viewers are enabled at 518. At 520, it is determined if the data gathering, transmission and analysis is to be continued. As the viewer continues to watch the television 170, the data gathering and analysis continues wherein the method returns to 502 to receive the remote control data 120 along with the additional information. In case the viewer stops viewing the television 170, the method terminates on the end block. Thus, by enabling reception and analysis of the keypress data 128 along with other information such as the date-time stamps 122, the location information 124 and the acoustic fingerprinting data 126 a two-way communication is established between the viewer(S) 182/184 and the television service provider via the communication network 130. The television 170 or the STB 150 not only provides content to the viewers 182, 184 but is also able to exchange information with the backend iRPD system 100 via establishing a return path data through the communication network 130. This enables in unique identification of each of the viewers 182, 184 leading to a number of applications as detailed herein.

Figure 6:
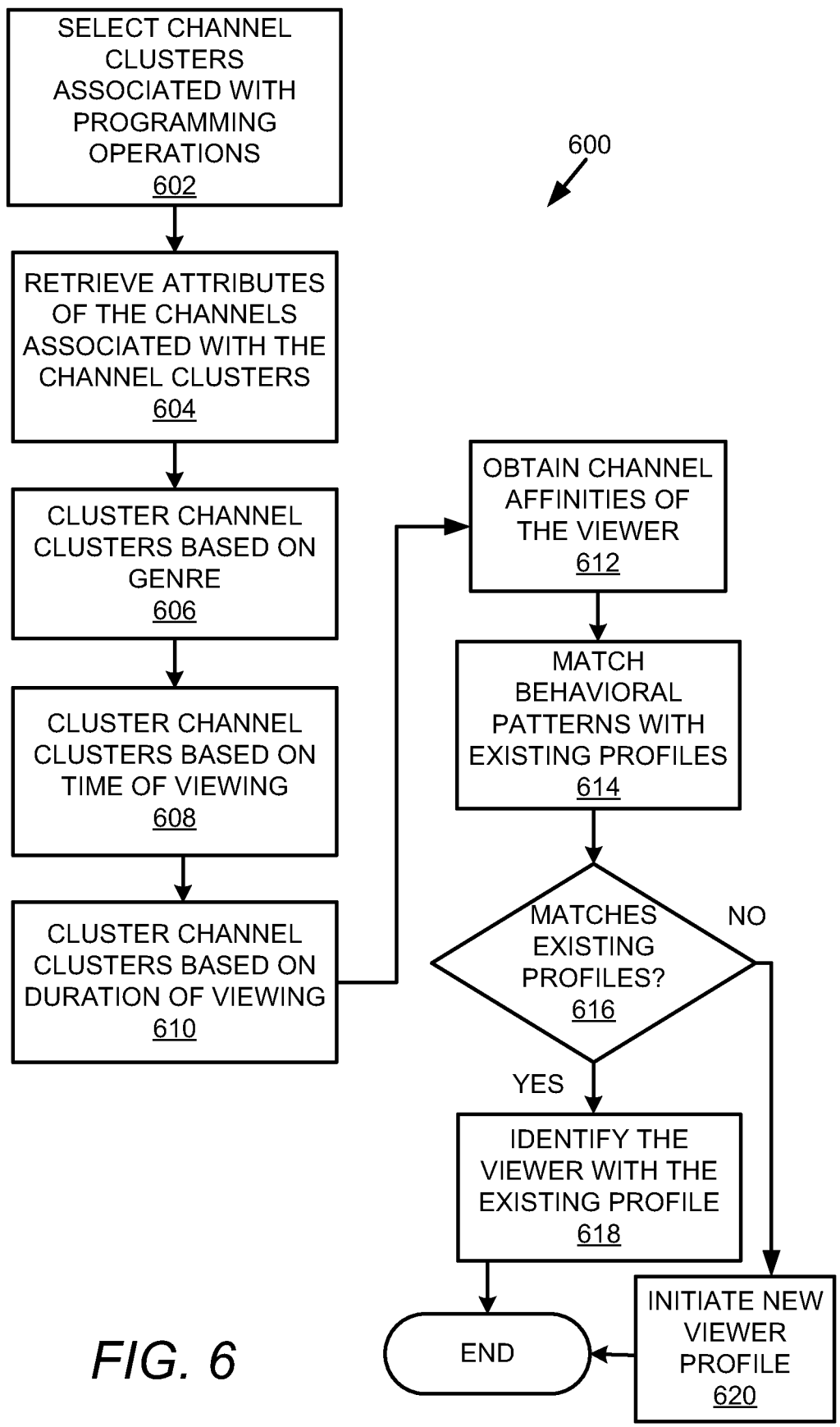
FIG. 6 shows a flowchart that details a method of identifying the viewer in accordance with the examples disclosed herein.

FIG. 6 shows a flowchart 600 that details a method of identifying the viewer in accordance with the examples disclosed herein. The viewer is identified based on distinct viewing patterns that emerge from the remote control data 120 based on the viewer's 182 actions associated with channel scrubbing, selecting particular channels, the timings at which the viewer watched particular programs etc. The method begins at 602 wherein the key clusters 222 associated with specific channels or key clusters associated with the programming operations, i.e., channel clusters are selected. The attributes regarding the channels associated with the channel clusters are retrieved at 604. The channel attributes can include general channel attributes such as the channel name, genre, whether the channel is a premium channel etc. and viewer-specific channel attributes such as the time at which the viewer watched the channel, the duration, the frequency with which the viewer accesses the channel, the type of approach to the channel (i.e., whether accessed directly or in channel scrubbing etc.) The channel clusters are further clustered based on the retrieved attributes. At 606, the channel clusters can be further clustered based on the genre associated with the channels. Similarly at 608, the channel clusters can be further clustered based on the time at which the channels are viewed. At 610, the channel clusters are further clustered based on the duration of the viewing session. Similarly the channel clusters can be further clustered based on unique consumption pattern of a typical content or other characteristic viewing behaviors such as channel affinities. Accordingly, the channel affinities of the viewer are obtained at 612.

By way of illustration and not limitation, viewer habits wherein the viewer watches a movie every weekend from 9.00 PM-12.00 AM after which, the viewer watches a game show for 1 hour can be used for the clustering. Such behavior patterns can be identified by clustering the key clusters 222 on the time of viewing. In an example, GMM-EM methodologies can be employed for generating the clusters based on various channel attributes. One of the viewer characteristics that differentiates the viewer behavior and aids in the unique identification of the viewer includes channel affinities. Affinity towards a channel can be obtained as a function of the distance between clusters representing that channel and the next succeeding channel. Other factors that can be considered for channel affinity estimation include average duration per session for which the channel is watched, removing days on which the TV was not switched and frequency of channels watched. On generating the behavior clusters, the count of unique behaviors can be established by:

$$\text{Count of unique behaviors} = \text{Count of Behavior clusters} - X \quad \text{Eq. (1)}$$

wherein X=number of overlapping clusters.

At 614, the behavior obtained at 612 is matched with the behavior patterns of the existing viewer profiles 172, 174 etc. In an example, pattern matching methodologies can be employed to obtain a match score of the behavioral clusters obtained from 606-612 to those in the existing viewer profiles. At 616, it is determined if the viewer can be identified from one of the existing viewer profiles or if the viewer has to be designated a new viewer based for example, on a match score. If the viewer matches an existing viewer, then the remote control data 120 is added at 618 to the matching viewer profile and further user actions can be based on the matching viewer profile. For example, the behavioral pattern from the remote control data 120 of the viewer 182 may match those in the viewer profile 172 and hence the viewer 182 is identified. If the behavior pattern does not match any of the existing profiles, then a new viewer profile can be initiated at 620.

Figure 7:
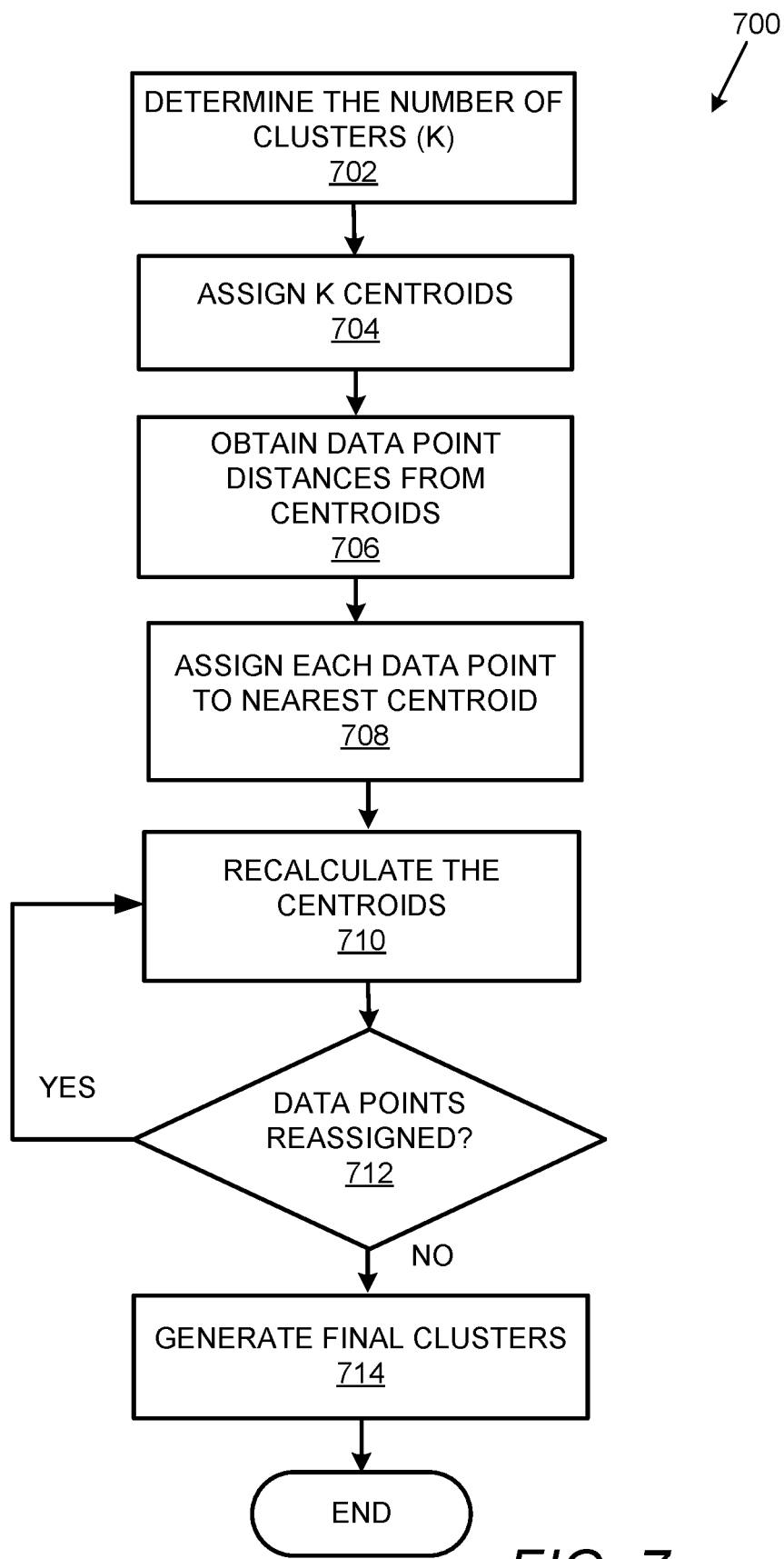
FIG. 7 shows a flowchart that details the Expectation-Maximization (EM) clustering with Gaussian Mixture Models (GMMs) used in accordance with some examples disclosed herein.

FIG. 7 shows a flowchart 700 that details the Expectation-Maximization clustering with Gaussian Mixture Models used in accordance with some examples disclosed herein. The method begins at 702 wherein the number of clusters 'K' is determined. The number of clusters can be set by the administrative user of the iRPD system 100 based on the data requirements. Accordingly, at 704, 'K' number of centroids are assigned which are selected from the received dataset wherein each centroid represents a given cluster. These centroids form the initial group centroids. At 706, the distances of each of the data points to the centroids are obtained, using for example, Euclidean distance measure. At 708, each data point is assigned to the corresponding nearest centroid. The centroids are re-calculated at 710. At 712 it is determined if any of the data points have been reassigned to the centroids. If no data points are reassigned, then the final clusters are generated at 714. If it is determined at 712 that the data points are reassigned, then the method returns to 710 to re-calculate the centroids.

Figure 8:
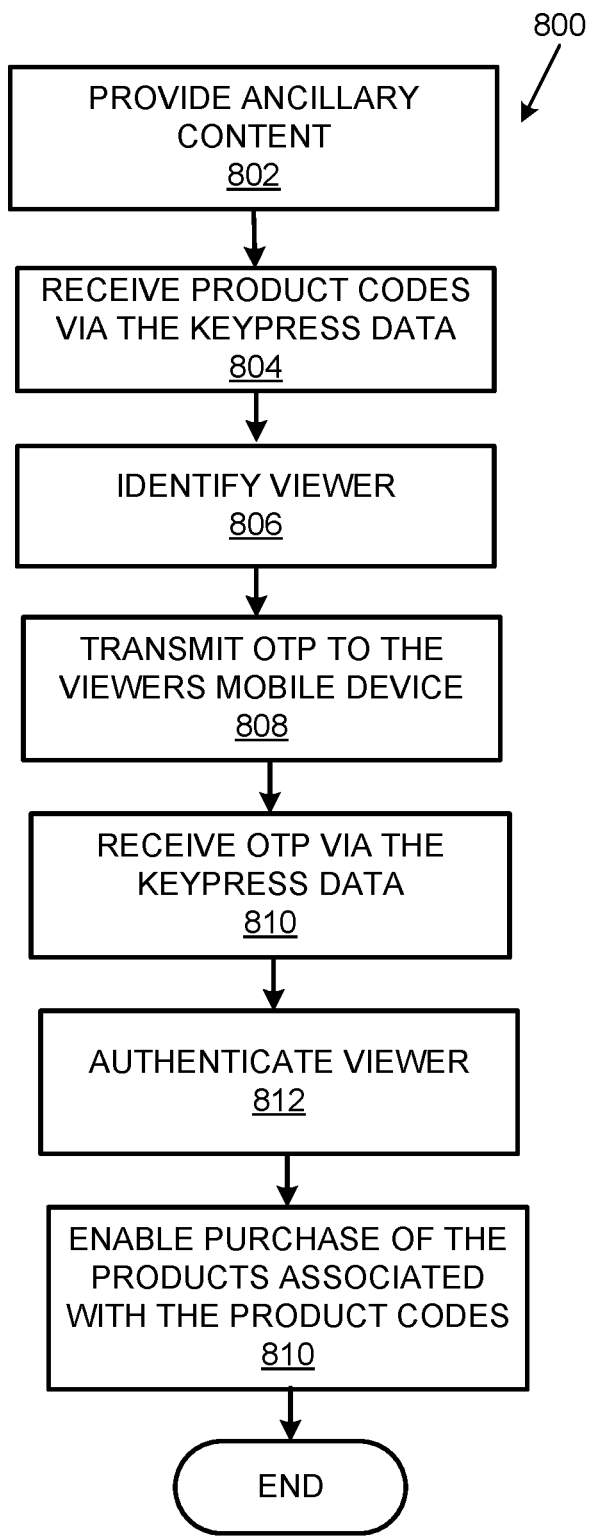
FIG. 8 shows a flowchart that details a method of enabling ecommerce activity by the iRPD system.

FIG. 8 shows a flowchart 800 that details a method of enabling ecommerce activity by the iRPD system 100. The ancillary content such as an advertisement is provided along with the main content at 802. The advertising content can include one or more product codes identifying products that are visible or imaged in the main content item and which are available for purchase by at least one of the viewers 182, 184. The viewer who decides to purchase the product is instructed to enter the product code via the remote control device 160. Accordingly, at 804, the product code(s) identifying the product(s) that the viewer would like to purchase are received at the iRPD system 100 via the keypress data 128. Various methodologies can be implemented in order to identify the product codes from the viewer keypress information. In an example, pattern matching techniques can be employed to identify product codes which can be configured to confirm to specific patterns that are distinct from channel numbers or other control operations executed via the remote control device 160. The product codes can be transmitted along with the date-time stamps and location information to enable better user/viewer authentication. The viewer is identified at 806 in accordance with the examples disclosed herein. In an example, the viewer's location as derived from the location information 124 can be used for additional viewer identity verification. Further user or viewer authentication can be enabled via different communication channels or modalities such as, sending a pass code to a registered email address or transmitting a one-time password (OTP) associated with a viewer account. Accordingly, an OTP is transmitted to the viewer's registered mobile number at 808 with the instruction to the viewer to enter the OTP via the remote control device 160. The OTP is received at 810 and verified for authentication at 812. In an example, the keypress data 128 can be examined to identify if the correct OTP is entered. Furthermore, the location information 124 can also be used to verify the viewer as the location information 124 has to match with the location of the television 170. The viewer profile can also be additionally retrieved to authenticate the viewer for ecommerce activities. At 814, the purchase of the product(s) associated with the product codes transmitted by the viewer is enabled.

Figure 9:
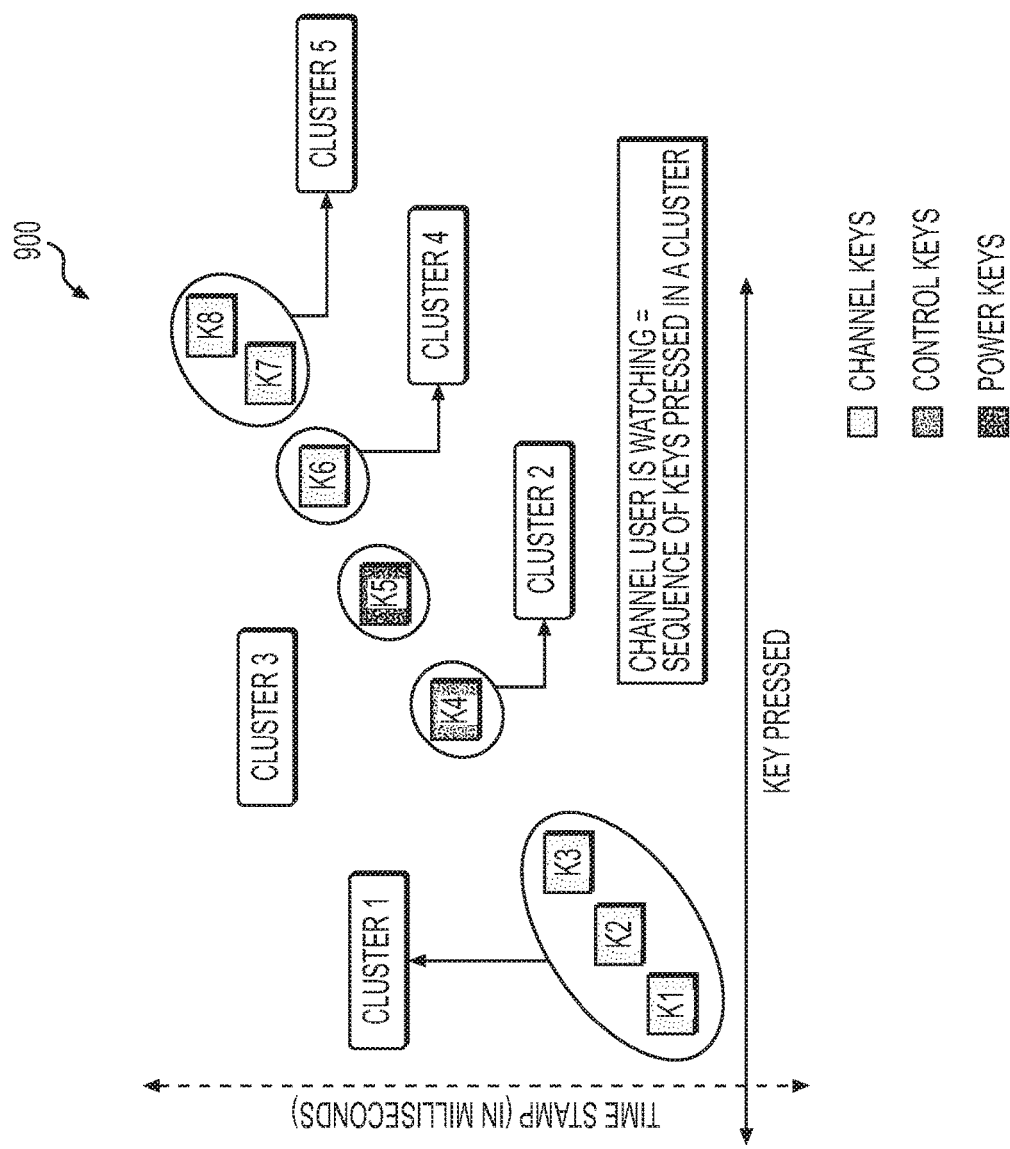
FIG. 9 shows a graph wherein the keys pressed by the viewer are clustered based on their respective time stamps in accordance with the examples disclosed herein.

FIG. 9 shows a graph 900 wherein the keys pressed by the viewer are clustered based on their respective time stamps in accordance with the examples disclosed herein. More particularly, the graph 900 shows the data from the keypress pattern sample 902. Keys 1, 2 and 3 are clustered together as cluster 1 based on the time stamps 904. The cluster 1 can pertain to a selected channel. Cluster 2 includes a volume adjustment operation and cluster 3 also includes a power off button. It can be determined that cluster 4 is invalid data as it occurs after a power off operation. Cluster 4 includes another channel selection operation. Thus, various keys identified from the keypress data are plotted and conclusions can be derived therefrom.

Figure 10:
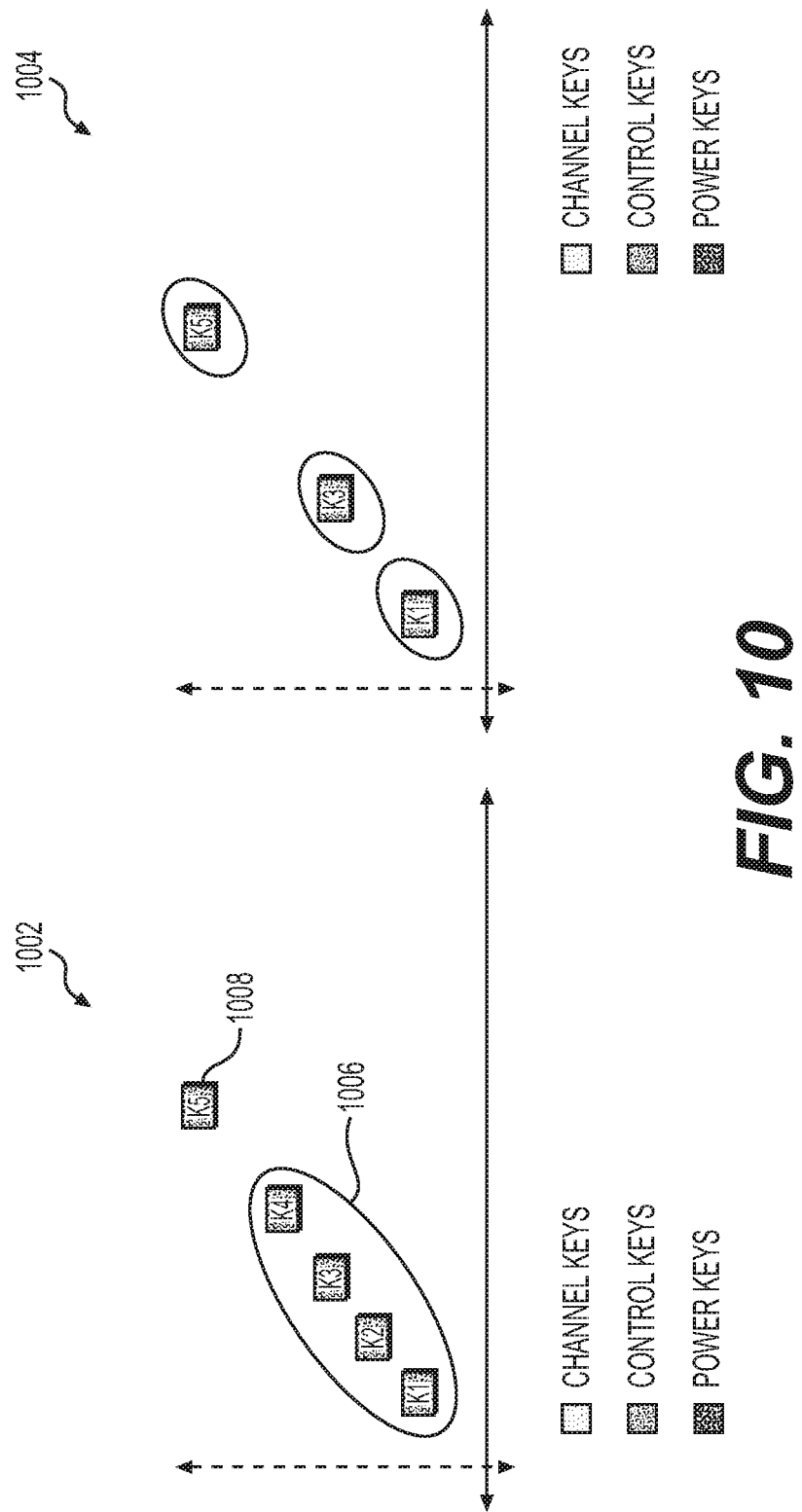
FIG. 10 shows two graphs plotting the channel scrubbing behavior and an invalid channel scrubbing behavior respectively in accordance with the examples disclosed herein.

FIG. 10 shows a two graphs 1002 and 1004 plotting the channel scrubbing behavior and an invalid channel scrubbing behavior respectively in accordance with the examples disclosed herein. In the graph 1002, the user presses a series of channel change keys as represented by the pattern 1006 before finally pressing another key 1008 after a considerable time gap. Hence, the channel arrived at by the user by pressing the key at 1008 e.g., Channel+ or Channel− to access the channels is an example of channel scrubbing where the user arrives and watches a channel without directly entering the channel number. The graph 1004 shows that each of the three keys were pressed with considerable time gaps. As a result, the iRPD system 100 determines that this is an invalid channel scrubbing behavior since the viewer selected the channels and continued to watch each of the three channels. Thus, invalid scrubbing behavior is a better signifier of channel affinity of the viewer as opposed to valid scrubbing behavior.

Figure 11:
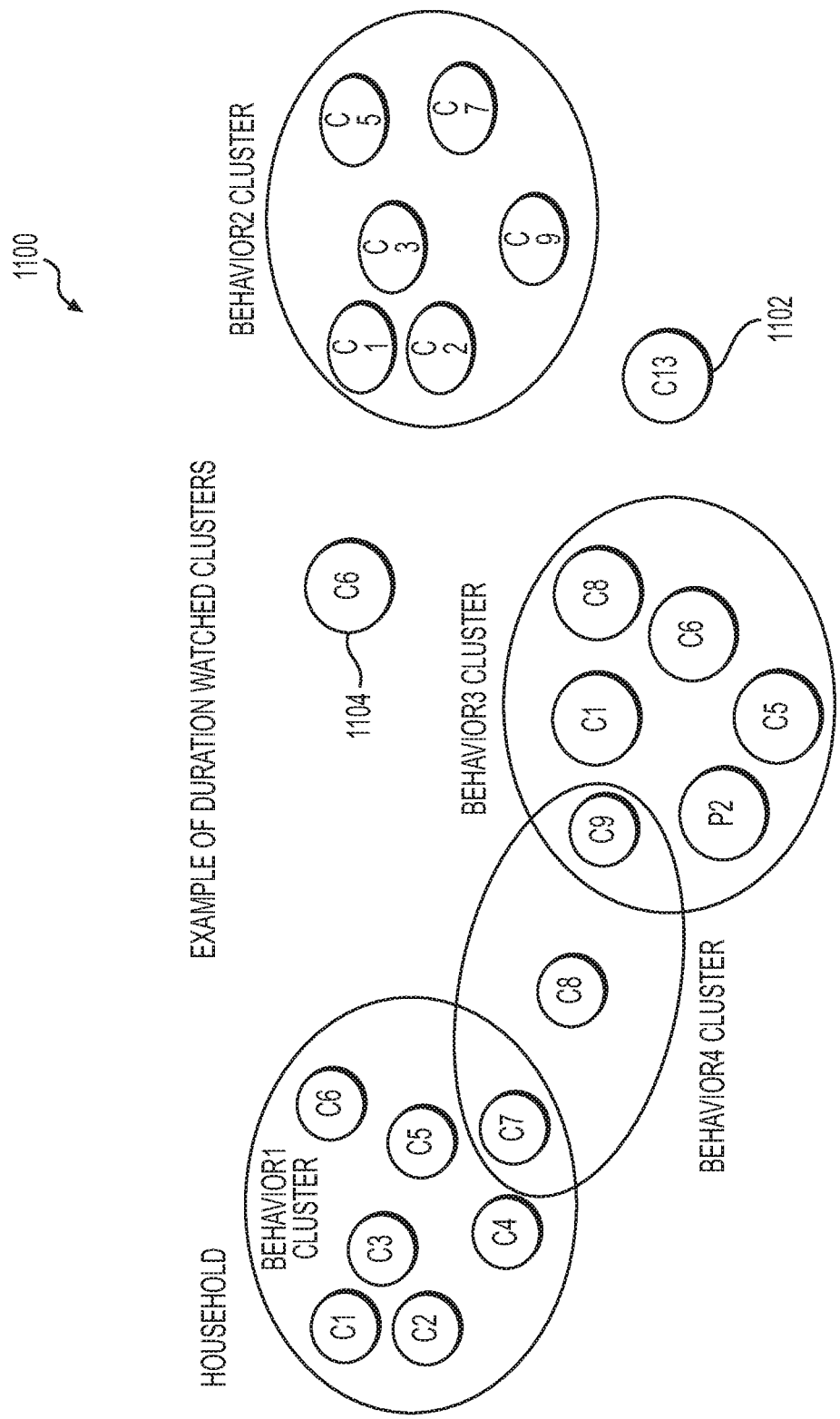
FIG. 11 shows data clustered based on the duration the viewers watched the channels.

FIG. 11 shows data clustered based on the duration the viewers watched the channels. Each of C1, C2 etc., represent channels watched while the size of the circles represents the duration for which each of the channels was viewed. As three of the clusters including the behavior 1 cluster, the behavior 4 cluster and behavior 3 cluster are overlapping, they are not counted while the behavior 2 cluster is counted along with 1102 and 1104. In an example, k-means methodology can be used to form the behavior clusters.

Figure 12:
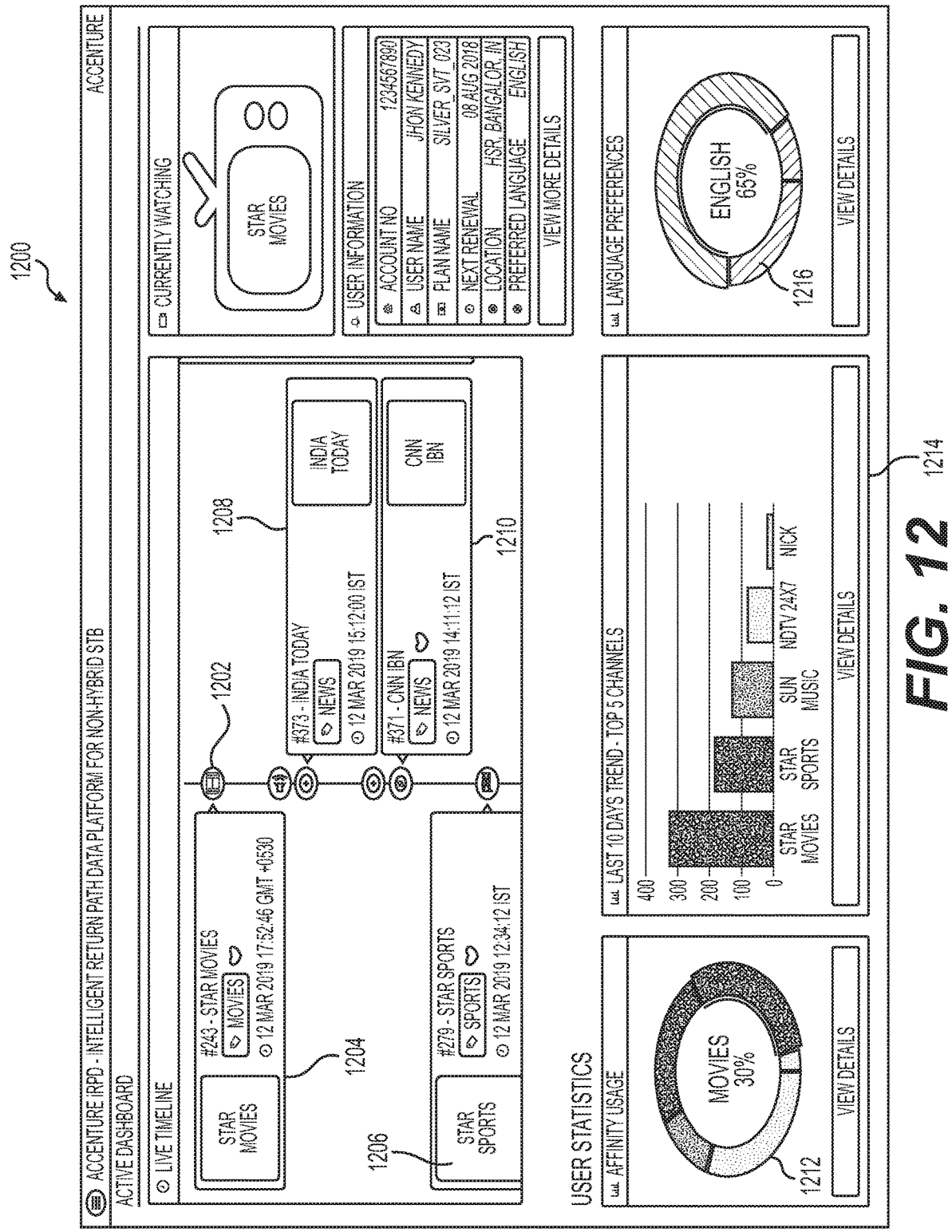
FIG. 12 illustrates a dashboard that shows the information collected from the keypress data in accordance with the examples disclosed herein.

FIG. 12 illustrates a dashboard 1200 that shows the information collected from the keypress data in accordance with the examples disclosed herein. A viewer timeline 1202 is shown with the various channels 1204, 1206, 1208, 1210 viewed at different time points. In addition, the graph 1212 is used for representing the user affinities for various genres of content provided. The most watched channels for a given time period e.g., 1 week or 1 month etc., are shown in the bar graph 1214 and the language preferences are shown at 1216. Based on the bar graph at 1214, a usage billing scheme may be implemented instead of the subscription schemes normally used in linear television. So the channels identified at 1214 may only be billed to the viewer.

Figure 13:
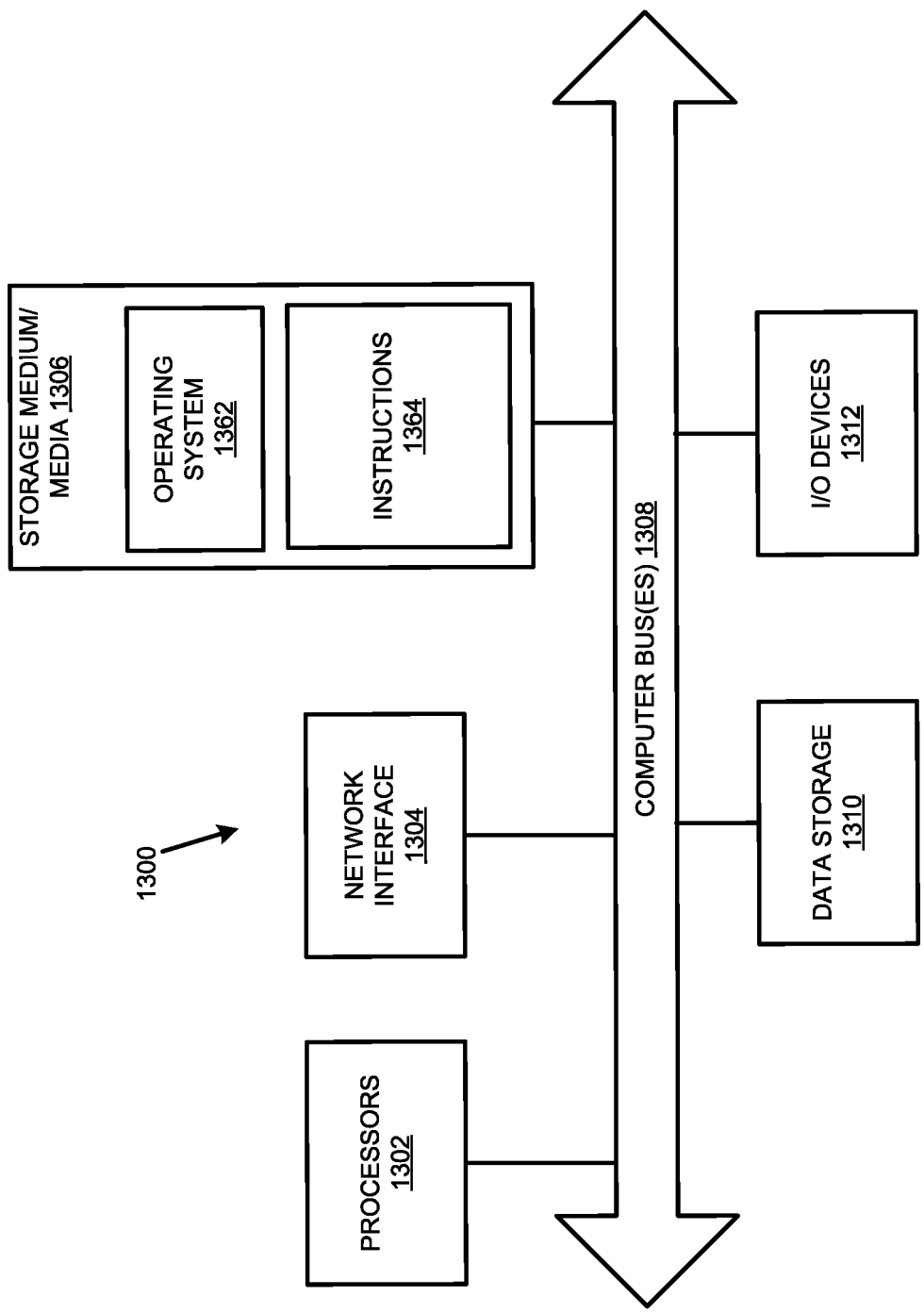
FIG. 13 illustrates a computer system that may be used to implement the iRPD system in accordance with the examples disclosed herein.

FIG. 13 illustrates a computer system 1300 that may be used to implement the iRPD system 100. More particularly, computing machines such as desktops, laptops, smartphones, tablets and wearables which may be used to generate or access the data from the iRPD system 100 may have the structure of the computer system 1300. The computer system 1300 may include additional components not shown and that some of the process components described may be removed and/or modified. In another example, a computer system 1300 can sit on external-cloud platforms such as, Amazon Web Services, AZURE cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G, 4G, 5G mobile WAN or a WiMax WAN, a cellular interface for communicating with cellular networks and a computer-readable medium/processor-readable medium 1306. Each of these components may be operatively coupled to a bus 1308. The computer-readable medium 1306 may be any suitable medium which participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 to perform the methods and functions of the iRPD system 100.

The iRPD system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the iRPD system 100. The operating system 1362 may be multi-user, multiprocessing, multitasking, multithreading, real-time and the like. For example, during runtime, the operating system 1362 is running and the code for the iRPD system 100 is executed by the processor(s) 1302.

The computer system 1300 may include a data storage 1310, which may include non-volatile data storage. The data storage 1310 stores any data used by the iRPD system 100. The data storage 1310 may be used to store the remote control data 120, the location information 124 and other additional information received from the remote control device 160, the viewer profiles 172, 174, the viewer behavioral patterns etc.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based intelligent return path data (iRPD) system comprising:
at least one processor;
a non-transitory processor readable medium storing machine-readable instructions that cause the at least one processor to:
receive via a communication network, remote control data including keypress data manipulating a television via a non-hybrid set top box, wherein the keypress data is indicative of one or more keys pressed by a viewer on a remote control device for operating the television and the remote control data includes date-time stamps for the keys pressed and location information of the television;
generate a first set of clusters by clustering the keypress data received in the remote control data using a first clustering methodology based on the date-time stamps; identify the keys pressed by the viewer;
determine operations executed by the viewer on the television based at least on the first set of clusters, wherein the operations include programming operations and non programming control operations;
further cluster the first set of clusters using a trained clustering behavior model that implements a second clustering methodology different from the first clustering methodology, the trained clustering behavior model analyzes viewer behavioral patterns identified from the operations, wherein the further clustering is based at least on a plurality of factors;
identify the viewer at a location of the television based on an output from the trained clustering behavior model; and
identify viewer behavioral patterns of the viewer based on patterns of clusters formed by the further clustering of the first set of clusters, wherein the identification of the viewer behavioral patterns includes:
determining whether the viewer arrived at a selected television channel via channel scrubbing or if the viewer directly accessed the selected television channel based on the patterns of the clusters generated by the trained clustering behavior model,
identifying numeric clusters from the further clusters using a classifier, wherein the numeric clusters represent the programming operations, and
determining affinity of the viewer to television channels accessed by the viewer based at least on a distance between the numeric clusters generated by the trained clustering behavior model, wherein greater distance between the numeric clusters generated by the trained clustering behavior model indicates the viewer accessing the television channels using numeric keys of the remote control device as determined from the keypress data and the higher affinity of the viewer to the television channels represented by the numeric clusters separated by the greater distance.

2. The iRPD system of claim 1, wherein the non-transitory processor readable medium stores further machine-readable instructions to receive the keypress data that cause the at least one processor to: pre-process the keypress data via normalization.

3. The iRPD system of claim 1, wherein the machine-readable instructions to generate clusters of the keypress data comprise further machine readable instructions that cause the at least one processor to:
receive the keypress data as hexadecimal code corresponding to each of the keys pressed by the viewer;
generate using K-means clustering as the first clustering methodology, one or more of the clusters indicative of the programming operations and the non-programming control operations wherein the keys are clustered based at least on the date-time stamps.

4. The iRPD system of claim 3, wherein the machine-readable instructions to determine the operations comprise further machine readable instructions that cause the at least one processor to:
map the keys identified from at least one of the clusters to a television channel number using a channel taxonomy, wherein the at least one of the cluster corresponds to the programming operations.

5. The iRPD system of claim 3, wherein the machine-readable instructions to determine the operations comprise further machine readable instructions that cause the at least one processor to:
identify at least one of the clusters as corresponding to the non-programming control operations when the keys identified from the at least one cluster cannot be mapped to at least one television channel number in a channel taxonomy.

6. The iRPD system of claim 3, wherein the trained clustering behavior model implements Gaussian Mixture Models (GMM) as the second clustering methodology for the further clustering and the plurality of factors include channel genre, the date and time stamps, duration watch pattern and unique consumption pattern of the television channels.

7. The iRPD system of claim 6, comprising further machine readable instructions that cause the at least one processor to:
monitor usage of each of the television channels by the viewer; and
implement a metered usage billing to the viewer based on the identity of the viewer.

8. The iRPD system of claim 1, wherein the viewer behavioral patterns are indicative of one of channel scrubbing behavior and invalid channel scrubbing behavior.

9. The iRPD system of claim 1, wherein the non-transitory processor readable medium stores further machine-readable instructions that cause the at least one processor to:
provide a dashboard that shows information collected from the keypress data wherein the dashboard includes at least:
a viewer timeline pertaining to the viewer that displays various channels viewed at different times; and
a graph that represents affinities of the viewer for various genres of content.

10. A non-transitory processor-readable storage medium comprising machine-readable instructions that cause a processor to:
receive via a communication network, remote control data including keypress data manipulating a television connected to a non-hybrid set top box, wherein the keypress data is indicative of one or more keys pressed by a viewer on a remote control device for operating the television and the remote control data includes date-time stamps for the keys pressed and location information of the television;
generate a first set of clusters by clustering the keypress data received in the remote control data using a first clustering methodology based on the date-time stamps;
identify the keys pressed by the viewer;
determine operations executed by the viewer on the television based at least on the first set of clusters, wherein the operations include programming operations and non programming control operations;
further cluster the first set of clusters using a trained clustering behavior model that implements a second clustering methodology different from the first clustering methodology, the trained clustering behavior model analyzes viewer behavioral patterns identified from the operations, wherein the further clustering is based at least on a plurality of factors;
identify the viewer at a location of the television based on an output from the trained clustering behavior model; and
identify viewer behavioral patterns of the viewer based on patterns of clusters formed by the further clustering of the first set of clusters, wherein the identification of the viewer behavioral patterns includes:
determining whether the viewer arrived at a selected television channel via channel scrubbing or if the viewer directly accessed the selected television channel based on patterns of the clusters generated by the trained clustering behavior model,
identifying numeric clusters from the further clusters using a classifier, wherein the numeric clusters represent the programming operations, and
determining affinity of the viewer to television channels accessed by the viewer based at least on a distance between the numeric clusters generated by the trained clustering behavior model, wherein greater distance between the numeric clusters generated by the trained clustering behavior model indicates the viewer accessing the television channels using numeric keys of the remote control device as determined from the keypress data and the higher affinity of the viewer to the television channels represented by the clusters separated by the greater distance.

11. The non-transitory processor-readable storage medium of claim 10, wherein the instructions to receive the remote control data further comprising instructions that cause the processor to:
receive the remote control data via a dongle attached to the set top box wherein the keypress data is received as hexadecimal code of each corresponding to each of the keys pressed by the viewer.

12. The non-transitory processor-readable storage medium of claim 10, wherein the instructions to receive the remote control data further comprising instructions that cause the processor to:
receive the remote control data via a communication module included in the remote control device, wherein the keypress data is received as hexadecimal code of each corresponding to each of the keys pressed by the viewer.

13. The non-transitory processor-readable storage medium of claim 10, wherein the trained clustering behavior model implements Gaussian Mixture Models (GMM) as the second clustering methodology for the further clustering and the plurality of factors include at least two of channel genre, the date and time stamps, duration watch pattern and unique consumption pattern of the television channels.

* * * * *